United States Patent
Abel et al.

(10) Patent No.: US 7,649,933 B2
(45) Date of Patent: Jan. 19, 2010

(54) METHOD AND APPARATUS FOR DETERMINING A POSITION OF AN OFFSET LATCH EMPLOYED FOR DECISION-FEEDBACK EQUALIZATION

(75) Inventors: Christopher J. Abel, Coplay, PA (US); Mohammad S. Mobin, Orefield, PA (US); Gregory W. Sheets, Bangor, PA (US); Vladimir Sindalovsky, Perkasie, PA (US); Lane A. Smith, Easton, PA (US)

(73) Assignee: Agere Systems Inc., Allentown, PA (US)

( * ) Notice: Subject to any disclaimer, the term of this patent is extended or adjusted under 35 U.S.C. 154(b) by 582 days.

(21) Appl. No.: 11/414,522

(22) Filed: Apr. 28, 2006

(65) Prior Publication Data

US 2007/0253477 A1 Nov. 1, 2007

(51) Int. Cl.
*H03H 7/30* (2006.01)
*H03H 7/40* (2006.01)
*H03K 5/159* (2006.01)

(52) U.S. Cl. .................. 375/233; 375/354; 375/355; 375/371

(58) Field of Classification Search .......... 375/233, 375/354, 355, 371, 373, 376; 331/4, 12, 331/25, 34
See application file for complete search history.

(56) References Cited

U.S. PATENT DOCUMENTS 7,409,029 B2 * 8/2008 Kawasaki et al. ........... 375/376
2002/0085656 A1 7/2002 Lee et al.

OTHER PUBLICATIONS

Yang et al., "High-Performance Adaptive Decision Feedback Equalizer Based on Predictive Parallel Branch Slicer Scheme," IEEE, pp. 121-126 (2002).

* cited by examiner

*Primary Examiner*—Phuong Phu
(74) *Attorney, Agent, or Firm*—Ryan, Mason & Lewis, LLP

(57) ABSTRACT

Methods and apparatus are provided for determining a position of an offset latch employed for decision-feedback equalization. The position of an offset latch is determined by obtaining a plurality of samples of a data eye associated with a signal, the data eye comprised of a plurality of trajectories for transitions out of a given binary state; determining an amplitude of at least two of the trajectories based on the samples; and determining a position of an offset latch based on the determined amplitudes. The initial position of the offset latch can be placed, for example, approximately in the middle of the determined amplitudes for at least two of the trajectories. The initial position of the offset latch can be optionally skewed by a predefined amount to improve the noise margin.

17 Claims, 5 Drawing Sheets

METHOD AND APPARATUS FOR DETERMINING A POSITION OF AN OFFSET LATCH EMPLOYED FOR DECISION-FEEDBACK EQUALIZATION

FIELD OF THE INVENTION

The present invention relates generally to decision-feedback equalization techniques, and more particularly, to techniques for determining a position of one or more offset latches employed for decision-feedback equalization.

BACKGROUND OF THE INVENTION

Digital communication receivers must sample an analog waveform and then reliably detect the sampled data. Signals arriving at a receiver are typically corrupted by intersymbol interference (ISI), crosstalk, echo, and other noise. In order to compensate for such channel distortions, communication receivers often employ well-known equalization techniques. For example, zero equalization or decision-feedback equalization (DFE) techniques (or both) are often employed. Such equalization techniques are widely-used for removing intersymbol interference and to improve the noise margin. See, for example, R. Gitlin et al., Digital Communication Principles, (Plenum Press, 1992) and E. A. Lee and D. G. Messerschmitt, Digital Communications, (Kluwer Academic Press, 1988), each incorporated by reference herein. Generally, zero equalization techniques equalize the pre-cursors of the channel impulse response and decision-feedback equalization equalizes the past cursors of the channel impulse response.

In one typical DFE implementation, a received signal is sampled and compared to one or more thresholds to generate the detected data. A DFE correction is applied in a feedback fashion to produce a DFE corrected signal. The addition/subtraction, however, is considered to be a computationally expensive operation. Thus, a variation of the classical DFE technique, often referred to as Spatial DFE, eliminates the analog adder operation by sampling the received signal using two (or more) vertical slicers that are offset from the common mode voltage. The two slicers are positioned based on the results of a well-known Least Mean Square (LMS) algorithm. One slicer is used for transitions from a binary value of 0 and the second slicer is used for transitions from a binary value of 1. The value of the previous detected bit is used to determine which slicer to use for detection of the current bit. For a more detailed discussion of Spatial DFE techniques, see, for example, Yang and Wu, "High-Performance Adaptive Decision Feedback Equalizer Based on Predictive Parallel Branch Slicer Scheme," IEEE Signal Processing Systems 2002, 121-26 (2002), incorporated by reference herein. The offset position of the vertical slicers has been determined by evaluating an error term for a known receive data stream and adjusting the offset position using the well-known Least Mean Square algorithm. Such techniques, however, have been found to be unstable in a fixed point highly quantized signal environment and require excessive time to converge.

A need therefore exists for improved methods and apparatus for determining the desired offset position for the vertical slicers. A further need exists for methods and apparatus for determining the desired offset position for the vertical slicers based on an evaluation of the incoming data eye.

SUMMARY OF THE INVENTION

Generally, methods and apparatus are provided for determining a position of an offset latch employed for decision-feedback equalization. According to one aspect of the invention, a position of an offset latch employed by a decision-feedback equalizer is determined by obtaining a plurality of samples of a data eye associated with a signal, the data eye comprised of a plurality of trajectories for transitions out of a given binary state; determining an amplitude of at least two of the trajectories based on the samples; and determining a position of an offset latch based on the determined amplitudes. The initial position of the offset latch can be placed, for example, approximately in the middle of the determined amplitudes for at least two of the trajectories. The initial position of the offset latch can be optionally skewed by a predefined amount to improve the noise margin.

For example, the transitions out of a given binary state can be transitions out of a state of binary one and the at least two of the trajectories comprise a first trajectory associated with a transition to a value of binary one and a second trajectory having a maximum amplitude of the plurality of trajectories associated with a transition to a value of binary zero. When the transitions out of a given binary state are transitions out of a state of binary zero, the at least two of the trajectories comprise a first trajectory associated with a transition to a value of binary zero and a second trajectory having a minimum amplitude of the plurality of trajectories associated with a transition to a value of binary one.

A more complete understanding of the present invention, as well as further features and advantages of the present invention, will be obtained by reference to the following detailed description and drawings.

DETAILED DESCRIPTION

The present invention provides methods and apparatus for determining the desired offset position for the vertical slicers. According to one aspect of the invention, the offset position for the vertical slicers is determined based on an evaluation of the incoming data eye. The exemplary data eye monitor may be implemented, for example, using the techniques described in U.S. patent application Ser. No. 11/095,178, filed Mar. 31, 2005, entitled "Method and Apparatus for Monitoring a Data Eye in a Clock and Data Recovery System," incorporated by reference herein. Generally, one or more latches associated with the exemplary data eye monitor employ an envelope detection technique to evaluate the amplitude of the signal. For a discussion of suitable envelope detection techniques, see, for example, U.S. patent application Ser. No. 11/318,953, filed Dec. 23, 2005, entitled "Method and Apparatus for Adjusting Receiver Gain Based on Received Signal Envelope Detection," incorporated by reference herein.

Figure 1:
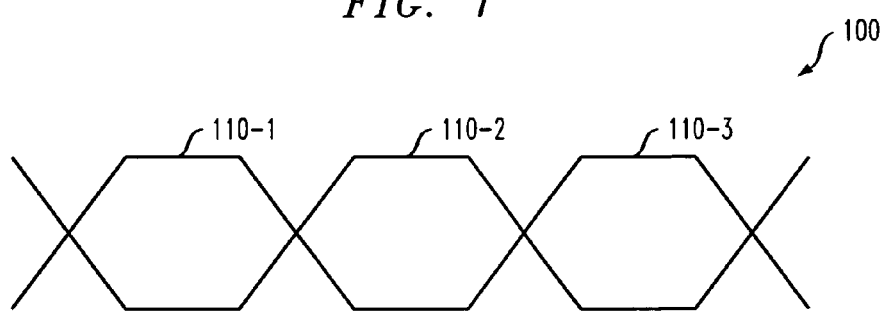
FIG. 1 graphically illustrates a number of ideal data eyes associated with a signal.

FIG. 1 graphically illustrates a number of ideal data eyes 110-1 through 110-3 associated with a signal 100. Although the ideal data eyes 110 shown in FIG. 1 do not exhibit any intersymbol interference for ease of illustration, each data eye 110 is typically a superposition of a number of individual signals with varying frequency components, in a known manner. As discussed below in conjunction with FIGS. 6 and 7, two or more latches 640-fixed and 640-roam are used to evaluate the amplitude of each data eye 110.

According to one aspect of the present invention, the amplitude of the received signal 110 can be determined based on the relative measurements of the two latches 640-fixed and 640-roam. The two latches 640-fixed and 640-roam are used to determine the upper and lower bounds of the signal, for transitions from binary 1 and for transitions from binary 0. The offset latches are then positioned based on the respective upper and lower bounds of the signal. For example, the offset latches can be positioned in the middle of the respective upper and lower bounds of the signal. In one variation discussed further below, the offset latches are positioned in a location that is skewed in time or amplitude (or both) from the middle position, based on one or more predefined criteria, for improved noise margining.

As discussed further below in conjunction with FIG. 9, in one exemplary embodiment, the data eye monitor measures the received signal 110 along the vertical axis to determine the location of the upper and lower bounds of the signal, for both cases of transitions from binary values of 1 and 0. Thereafter, the mid-point between the upper and lower bounds is established for both cases. The offset latches for both cases can be positioned based on the determined mid-point locations.

Figure 2A:
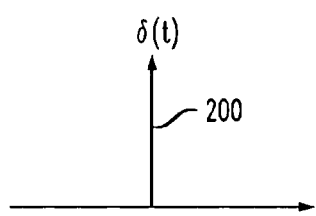
FIGS. 2A through 2D illustrate the distortion that can arise from a channel.
Figure 2C:
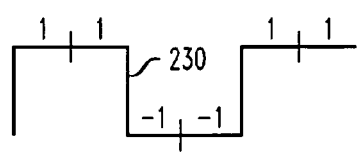
Figure 2B:
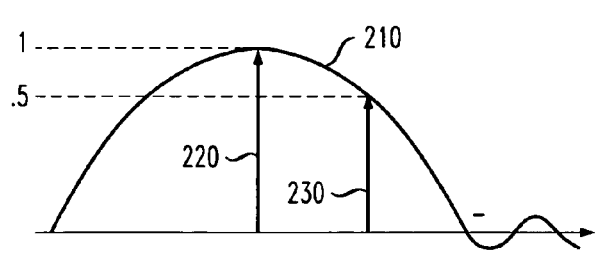

FIGS. 2A through 2D further illustrate the distortion that can arise from a channel. As shown in FIG. 2A, an ideal channel exhibits a delta function 200 as its impulse response. FIG. 2B illustrates an exemplary frequency response 210 for a hypothetical channel. As shown in FIG. 2B, in the frequency domain, the hypothetical channel may exhibit an frequency response having a magnitude of 1.0 at the primary tap 220. In addition, at a first post cursor tap 230 the hypothetical channel may exhibit a frequency response having a magnitude of 0.5. Thus, for this example, in the time domain, 50% of the signal will spillover and affect the next time interval.

Figure 2D:
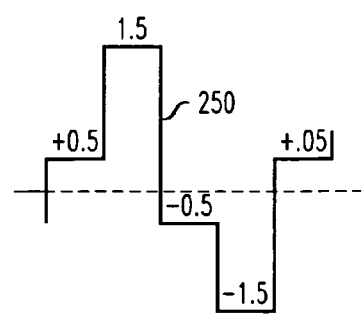

FIG. 2C illustrates an ideal clock signal 230 that may be transmitted across a channel. FIG. 2D illustrates the clock signal 250 that is received over the same channel as the result of channel distortion (after a sample/hold is applied). As shown in FIG. 2C, in each subsequent time slot, values of +1, +1, −1, −1, +1, +1, −1, −1, are transmitted to generate the clock signal 230. Assuming a channel having the exemplary impulse response 210 of FIG. 2B, and no channel compensation, the receiver will sample the signal 250 shown in FIG. 2D. The +1 that is transmitted in the second time slot will be superimposed with 50% of the +1 that was transmitted in the first time slot. Thus, a value of +1.5 will be measured at the receiver in the second time slot. Generally, one or more pre-emphasis techniques in the transmitter or equalization techniques in the receiver (or both) are employed in a well-known manner so that the signal processed by the receiver looks like the clock signal 230 that was transmitted.

Figure 3:
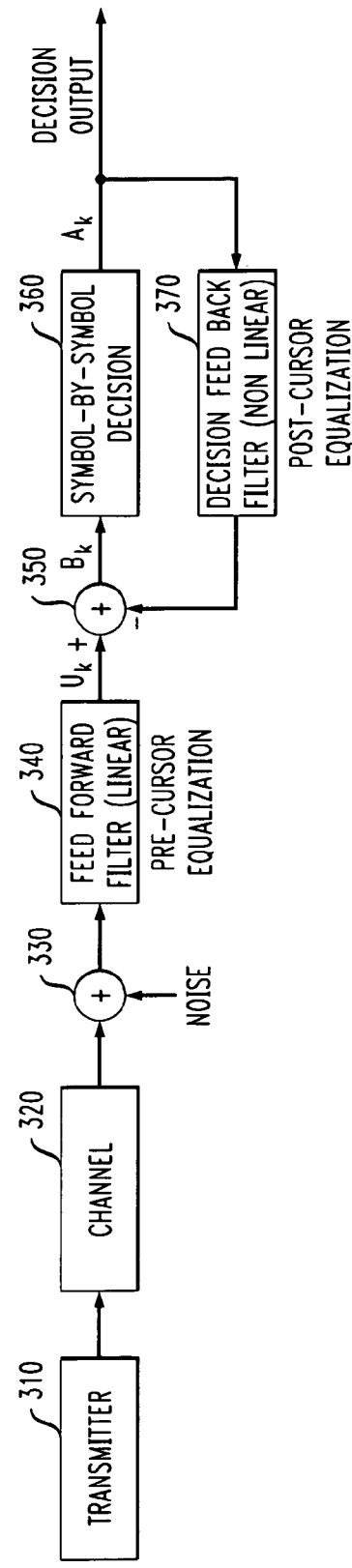
FIG. 3 is a block diagram of a transmitter, channel and receiver system that employs equalization techniques.

FIG. 3 is a block diagram of a transmitter, channel and receiver system 300 that employs equalization techniques. As shown in FIG. 3, the data is transmitted by a transmitter 310 through a channel 320 after optionally being equalized or filtered through a transmit FIR filter (TXFIR) (not shown). After passing though the channel 320, where noise is introduced, as represented by adder 330, the signal may optionally be filtered or equalized by a continuous time feed forward filter 340. Generally, the feed forward filter 340 performs pre-cursor equalization to compensate for the spillover from future transmitted symbols, in a known manner. The analog signal out of the feed forward filter 340 is sampled by a data detector 360 that generates data decisions.

A DFE correction generated by a DFE filter 370 is applied to an analog summer 350 from the output, $U_k$, of the feed forward filter 340 to produce a DFE corrected signal, $B_k$.

Figure 4:
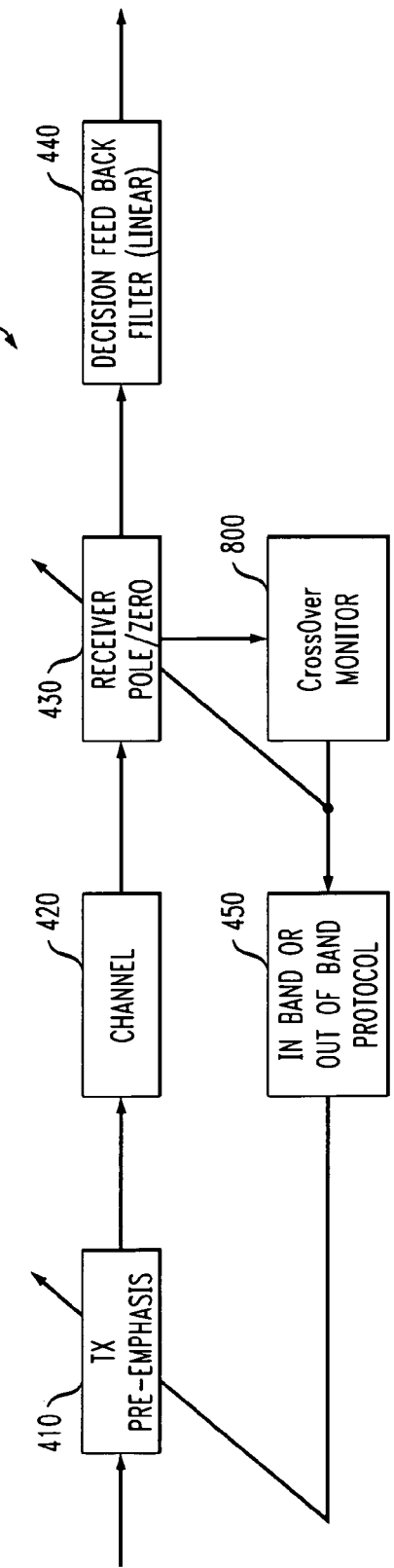
FIG. 4 is a block diagram of a transmitter, channel and receiver system that employs Spatial DFE.

FIG. 4 is a block diagram of a transmitter, channel and receiver system 400 that employs Spatial DFE. As indicated above, Spatial DFE is a variation of the classical DFE technique shown in FIG. 3 that eliminates the analog adder by sampling the received signal using two vertical slicers that are offset from the common mode voltage.

As shown in FIG. 4, pre-emphasis techniques 410 are applied in the transmitter before the signal is transmitted over a channel 420. In addition, equalization techniques 430, such as zero equalization, and spatial DFE 440 are applied in the receiver. According to one aspect of the invention, a cross over monitor 800, discussed below in conjunction with FIG. 8, implements a DFE offset latch positioning process 900, discussed below in conjunction with FIG. 9, to determine the position of the offset latches employed by the spatial DFE 440. When pre-emphasis techniques 410 are applied in the transmitter, the output of the cross over monitor 800 is fed back to the transmitter using an in-band or out of band protocol 450.

Figure 5:
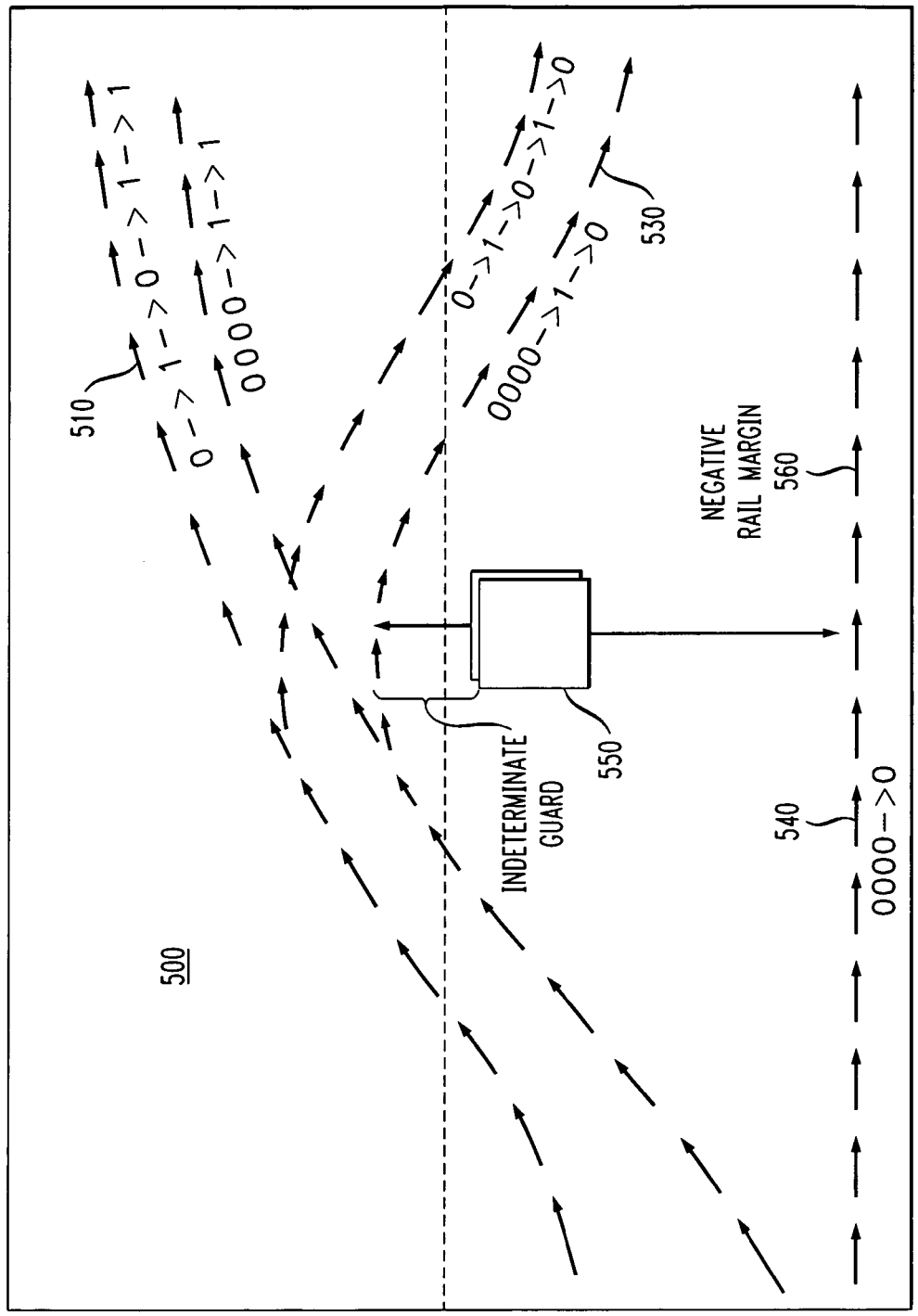
FIG. 5 illustrates an exemplary transition trajectory from an exemplary binary value of 0 to a binary value of 0 or 1.

As previously indicated, each data eye 110 is a superposition of a number of individual signals with varying frequency components, in a known manner. The signal associated with different data transitions will have a different frequency. FIG. 5 illustrates an exemplary transition trajectory for an exemplary transition from a binary value of 0 to a binary value of 0 or 1. A trajectory 510, for example, is associated with a transition from a binary value of 0 to a 1 (and then followed by another 1). A trajectory 530, for example, is associated with a transition from a binary value of 0 having prior states 000 to a binary value of 1 (followed by a 0). A trajectory 540 is associated with a transition from a binary value of 0 having prior states 000 to a binary value of 0.

As shown in FIG. 5, the different trajectories are all associated with a prior state of 0. Each trajectory, however, follows a different path. In accordance with the Spatial DFE technique 440, a single offset latch 550 must be able to detect whether the current data bit is a 0 or a 1, despite the varying paths. Generally, the offset latch 550 is positioned between the negative rail margin 560 and the amplitude of the lowest expected trajectory 530. According to the present invention, the data eye monitor 800 is used to determines a location for the offset latch 550 used for the spatial DFE 440.

Figure 6:
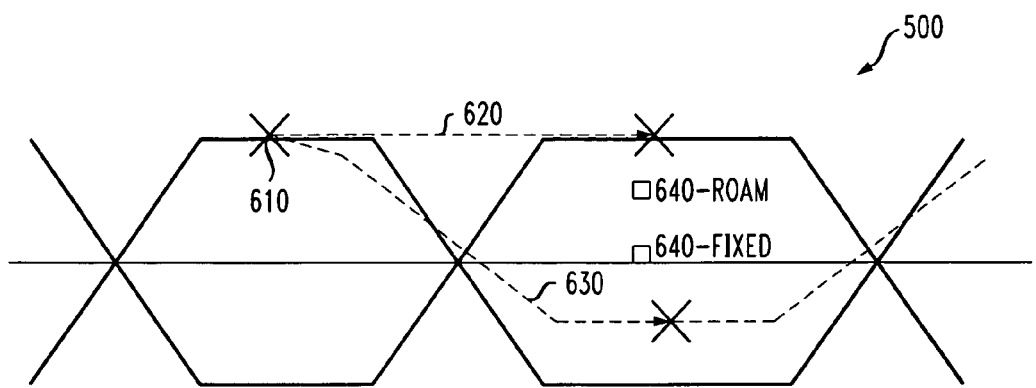
FIG. 6 illustrates the sampling of a signal using a data eye monitor in accordance with the present invention for a transition from a binary value of 1 to a binary value of 0 or 1.

FIG. 6 illustrates the sampling of a signal using a data eye monitor in accordance with the present invention for a transition 630 from an initial state 610 of binary value 1 to a binary value of 0 or a transition 620 from a binary value of 1 to a binary value of 1. For ease of illustration, only the trajectory 630 associated with the Nyquist frequency and the trajectory 620 associated with the maximum amplitude of the remaining frequencies are shown. As discussed below in conjunction with FIG. 8, two latches 640-fixed and 640-roam are employed in the exemplary embodiment to determine the amplitudes of the trajectories 620, 630 and thereby determine a location for the latches used for the spatial DFE 440. It is noted that a plurality of roaming latches 640-roam can optionally be employed for quicker detection.

Figure 7:
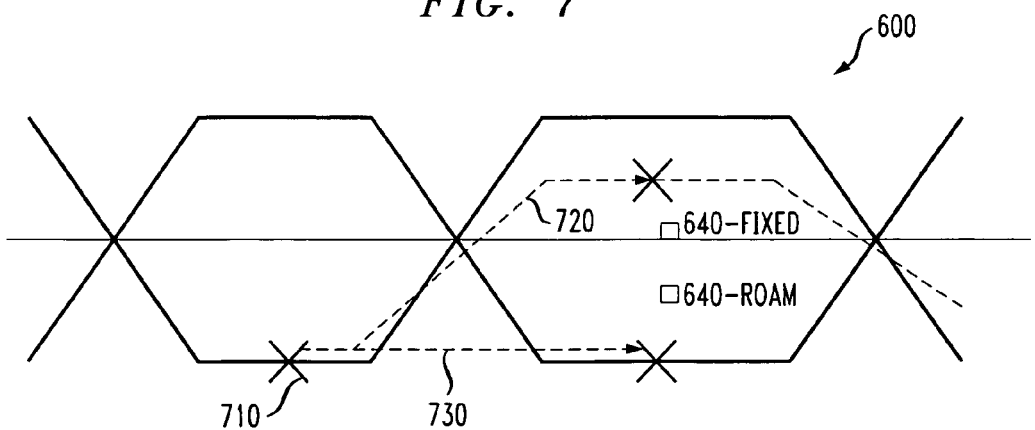
FIG. 7 illustrates the sampling of a signal using a data eye monitor in accordance with the present invention for a transition from a binary value of 0 to a binary value of 0 or 1.

FIG. 7 illustrates the sampling of a signal using a data eye monitor in accordance with the present invention for a transition 730 from an initial state 710 of binary value 0 to a binary value of 0 or a transition 720 from a binary value of 0 to a binary value of 1 and then a binary value of 0. For ease of illustration, only the trajectory 720 associated with the Nyquist frequency and the trajectory 730 associated with the minimum amplitude of the remaining frequencies are shown. As discussed below in conjunction with FIG. 8, the same two latches 640-fixed and 640-roam of FIG. 6 can be employed in the exemplary embodiment to determine the amplitudes of the trajectories 720, 730 and thereby determine a location for the latches used for the spatial DFE 440.

Figure 8:
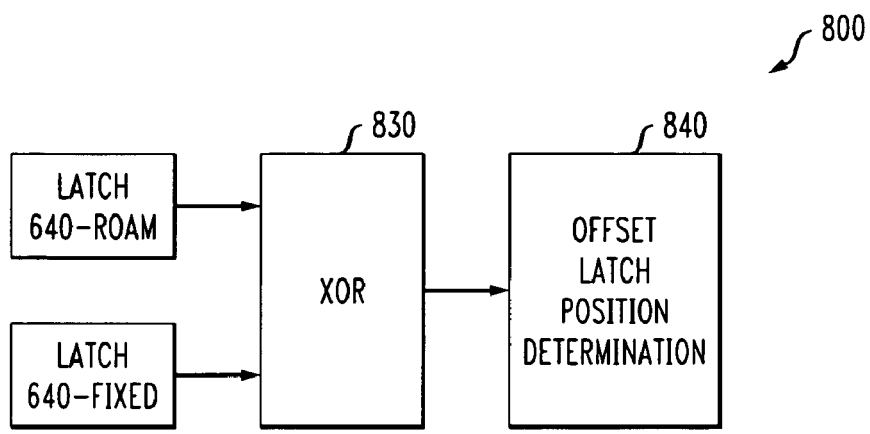
FIG. 8 illustrates one embodiment of the roaming latches of FIGS. 6 and 7.

FIG. 8 illustrates one embodiment of the roaming latches of FIGS. 6 and 7. Generally, the two latches 640-fixed and 640-roam are used to determine the amplitude of the two trajectories of interest for both cases of transitions from binary 0 and transitions from binary 1. The fixed latch 640-fixed is fixed at approximately the center of the amplitude range. The roaming latch 640-roam samples the signal along the vertical axis by varying the threshold voltage of the roaming latch 640-roam. In one exemplary implementation, the roaming latch 640-roam is stepped through each of N horizontal positions associated with a given eye, by varying the phase of the applied clock. Once the zero crossing points are identified, the midpoint associated with the center of the data eye can be established. The fixed latch 640-fixed is then fixed at the midpoint (time-wise and amplitude-wise). Generally, the timing of the latch 640 is fixed time-wise approximately centered between the zero crossings and is fixed amplitude-wise by of the threshold of the latch 640 to the common mode of the incoming signal. The roaming latch 640-roam is then stepped through each of M vertical levels of the determined middle point to measure the amplitude of the two trajectories of interest for both cases.

As shown in FIG. 8, the outputs of the two latches 640-fixed and 640-roam of FIGS. 5 and 6 are applied to an exclusive OR (XOR) gate 830. The XOR gate 830 compares the value of the two latches 640-fixed and 640-roam. If the values of the two latches 640-fixed and 640-roam match, the XOR gate 830 will generate a binary value of 0 and if the values of the two latches 640-fixed and 640-roam do not match, the XOR gate 830 will generate a binary value of 1. Thus, a "hit" occurs in the exemplary embodiment when the values of the two latches 640-fixed and 640-roam do not match.

The relative values of the two latches 640-fixed and 640-roam provide an indication of location of the two trajectories of interest for both cases. If the two latches 640-fixed and 640-roam have the same value, they are said to match. Thus, for samples taken inside a data eye (i.e., within the two trajectories of interest for each case), it would be expected that the value of the two latches 640-fixed and 640-roam match one another. For samples taken along the boundary of the data eye (within the multiple trajectories associated with a transition), it would be expected that some of the values of the two latches 640-fixed and 640-roam will match one another. For samples taken outside a data eye, it would be expected that all values of the two latches 640-fixed and 640-roam will not match. Thus, the inner eye is detected by the fully matching case (the output of the XOR 830 is all zeros) and the outer eye is detected by the fully mismatching case (the output of the XOR 830 is all ones) Thus, the number of samples taken outside the eye provides an indication of the maximum hit count.

In the exemplary embodiment of FIG. 8, the output of the XOR 630 is processed by an offset latch position determination stage 840. As previously indicated, the XOR 830 will generate a binary value of 0 when the outputs of the two latches 640-fixed and 640-roam match, and will generate a binary value of 1 when the outputs of the two latches 640-fixed and 640-roam do not match. Thus, binary values of 1 will be expected when the roaming latch 640-roam is sampling in the locations of the trajectories of interest.

Figure 9:
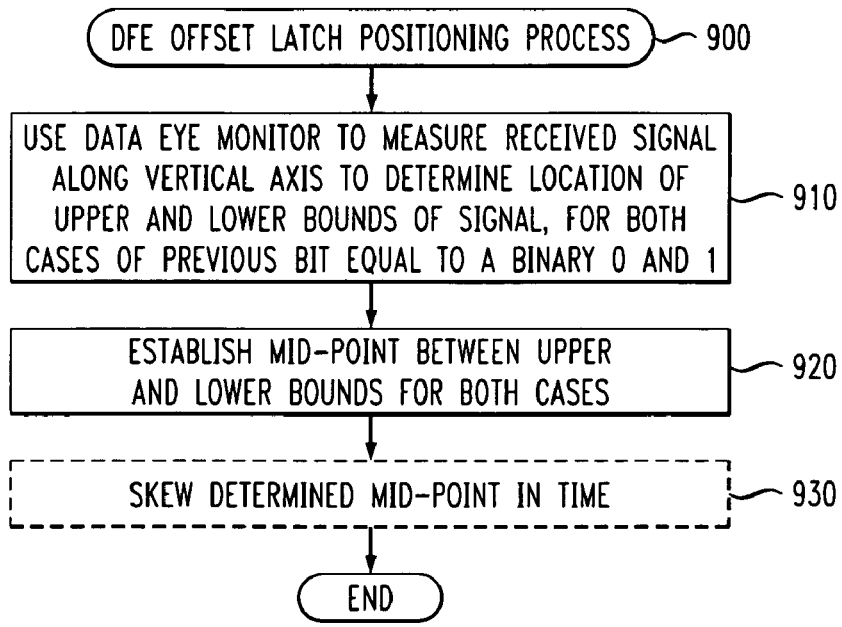
FIG. 9 is a flow chart describing an exemplary DFE offset latch positioning process incorporating features of the present invention.

FIG. 9 is a flow chart describing an exemplary DFE offset latch positioning process 900 incorporating features of the present invention. As shown in FIG. 9, the exemplary DFE offset latch positioning process 900 initially measures the signal 110 along the vertical axis during step 910 to determine the location of the upper and lower bounds, for both cases of transitions from binary values of 1 and 0. Thereafter, during step 920 the mid-point between the upper and lower bounds is established for both cases.

Optionally, the mid-point determined during step 920 can be skewed to the left during step 930 in time for improved noise margining. Thus, by shifting the latch by a predefined percentage to the left of center, the timing and voltage margin is improved.

A plurality of identical die are typically formed in a repeated pattern on a surface of the wafer. Each die includes a device described herein, and may include other structures or circuits. The individual die are cut or diced from the wafer, then packaged as an integrated circuit. One skilled in the art would know how to dice wafers and package die to produce integrated circuits. Integrated circuits so manufactured are considered part of this invention.

While exemplary embodiments of the present invention have been described with respect to digital logic blocks, as would be apparent to one skilled in the art, various functions may be implemented in the digital domain as processing steps in a software program, in hardware by circuit elements or state machines, or in combination of both software and hardware. Such software may be employed in, for example, a digital signal processor, micro-controller, or general-purpose computer. Such hardware and software may be embodied within circuits implemented within an integrated circuit.

Thus, the functions of the present invention can be embodied in the form of methods and apparatuses for practicing those methods. One or more aspects of the present invention can be embodied in the form of program code, for example, whether stored in a storage medium, loaded into and/or executed by a machine, or transmitted over some transmission medium, wherein, when the program code is loaded into and executed by a machine, such as a computer, the machine becomes an apparatus for practicing the invention. When implemented on a general-purpose processor, the program code segments combine with the processor to provide a device that operates analogously to specific logic circuits.

It is to be understood that the embodiments and variations shown and described herein are merely illustrative of the principles of this invention and that various modifications may be implemented by those skilled in the art without departing from the scope and spirit of the invention.

We claim:

1. A method for determining a position of an offset latch employed by a decision-feedback equalizer, comprising:

obtaining a plurality of samples of a data eye associated with a signal, said data eye comprised of a plurality of trajectories for transitions out of a given binary state of a previous symbol and into a binary state of a current symbol;

determining an amplitude of at least two of said trajectories based on said samples;

determining a position of a first offset latch based on said determined amplitudes for a first trajectory, wherein said first trajectory is from a binary state of one to a second binary state; and determining a position of a second offset latch based on said determined amplitudes for a second trajectory, wherein said second trajectory is from a binary state of zero to a third binary state.

2. The method of claim 1, wherein an initial position of said offset latch is placed approximately in the middle of said determined amplitudes for at least two of said trajectories.

3. The method of claim 1, wherein said obtaining step further comprises the steps of sampling the signal using a plurality of latches and estimating a value of said signal by evaluating one or more values of said latches.

4. The method of claim 3, wherein one or more of said plurality of latches sample said signal by sampling said signal for a plurality of steps within a unit interval.

5. The method of claim 3, wherein one or more of said plurality of latches sample said signal by sampling said signal for a plurality of voltage levels.

6. The method of claim 3, wherein a plurality of said latches sample said signal by sampling said signal for a plurality of positions.

7. The method of claim 1, further comprising the step of determining the location of an approximate middle point in time between crossings of a predefined voltage level in said signal.

8. The method of claim 7, further comprising the step of obtaining a plurality of samples of said signal along said approximate middle point in said signal.

9. The method of claim 1, wherein said step of determining a position of an offset latch based on said determined amplitudes further comprises the step of skewing an initially determined position by a predefined amount along the time axis.

10. A system for determining a position of an offset latch employed by a decision-feedback equalizer, comprising:

a plurality of latches for obtaining a plurality of samples of a data eye associated with a signal, said data eye comprised of a plurality of trajectories for transitions out of a given binary state of a previous symbol and into a binary state of a current symbol; and an amplitude monitor for:

determining an amplitude of at least two of said trajectories based on said samples;

determining a position of a first offset latch based on said determined amplitudes for a first trajectory, wherein said first trajectory is from a binary state of one to a second binary state; and determining a position of a second offset latch based on said determined amplitudes for a second trajectory, wherein said second trajectory is from a binary state of zero to a third binary state.

11. The system of claim 10, wherein an initial position of said offset latch is placed approximately in the middle of said determined amplitudes for at least two of said trajectories.

12. The system of claim 10, wherein one or more of said plurality of latches sample said signal by sampling said signal for a plurality of steps within a unit interval.

13. The system of claim 10, wherein one or more of said plurality of latches sample said signal by sampling said signal for a plurality of voltage levels.

14. The system of claim 10, further comprising the step of determining the location of an approximate middle point in time between crossings of a predefined voltage level in said signal.

15. The system of claim 14, further comprising the step of obtaining a plurality of samples of said signal along said approximate middle point in said signal.

16. The system of claim 10, wherein said amplitude monitor determines said position of said offset latch based on said determined amplitudes by skewing an initially determined position by a predefined amount along the time axis.

17. An integrated circuit, comprising:

a circuit for determining a position of an offset latch employed by a decision-feedback equalizer, comprising:

a plurality of latches for obtaining a plurality of samples of a data eye associated with a signal, said data eye comprised of a plurality of trajectories for transitions out of a given binary state of a previous symbol and into a binary state of a current symbol; and an amplitude monitor for:

determining an amplitude of at least two of said trajectories based on said samples;

determining a position of a first offset latch based on said determined amplitudes for a first trajectory, wherein said first trajectory is from a binary state of one to a second binary state; and determining a position of a second offset latch based on said determined amplitudes for a second trajectory, wherein said second trajectory is from a binary state of zero to a third binary state.

* * * * *